United States Patent
Ealer, Sr.

(10) Patent No.: US 10,519,667 B1
(45) Date of Patent: Dec. 31, 2019

(54) COLOR-COATED GUTTER COVER OF EXPANDED METAL AND METHOD OF MANUFACTURE

(71) Applicant: James E. Ealer, Sr., St. Clair, MO (US)

(72) Inventor: James E. Ealer, Sr., St. Clair, MO (US)

(73) Assignee: E-Z Products LLC, St. Clair, MO (US)

( * ) Notice: Subject to any disclaimer, the term of this patent is extended or adjusted under 35 U.S.C. 154(b) by 197 days.

(21) Appl. No.: 15/005,160

(22) Filed: Jan. 25, 2016

(51) Int. Cl.
| | | |
|---|---|---|
| *E04D 13/076* | (2006.01) | |
| *B21D 31/04* | (2006.01) | |
| *B32B 15/04* | (2006.01) | |
| *B32B 3/24* | (2006.01) | |
| *B32B 15/20* | (2006.01) | |
| *B32B 15/18* | (2006.01) | |
| *B32B 3/26* | (2006.01) | |

(52) U.S. Cl.
CPC .......... *E04D 13/076* (2013.01); *B21D 31/04* (2013.01); *B32B 3/266* (2013.01); *B32B 15/04* (2013.01); *B32B 15/18* (2013.01); *B32B 15/20* (2013.01); *B32B 2255/06* (2013.01); *B32B 2311/24* (2013.01); *B32B 2311/30* (2013.01); *B32B 2451/00* (2013.01); *Y10S 428/9133* (2013.01); *Y10T 29/18* (2015.01); *Y10T 29/49982* (2015.01); *Y10T 428/12361* (2015.01); *Y10T 428/12368* (2015.01); *Y10T 428/24273* (2015.01); *Y10T 428/24281* (2015.01); *Y10T 428/24306* (2015.01); *Y10T 428/24322* (2015.01)

(58) Field of Classification Search
None
See application file for complete search history.

(56) References Cited

U.S. PATENT DOCUMENTS

| | | | | |
|---|---|---|---|---|
| 1,637,410 A | * | 8/1927 | Coryell | E04F 13/04 52/446 |
| 2,175,138 A | * | 10/1939 | Westlake, Jr. | E04D 13/076 52/12 |
| 2,290,486 A | | 7/1942 | Ballard et al. | |

(Continued)

FOREIGN PATENT DOCUMENTS

| | | | | |
|---|---|---|---|---|
| AU | | 570957 B2 * | 3/1988 | E04D 13/076 |
| AU | 2005100465 B4 * | | 12/2005 | |

(Continued)

OTHER PUBLICATIONS

National Association of Architectural Metal Manufacturers, Standards for Expanded Metal, Dec. 2005 (Year: 2005).*

(Continued)

*Primary Examiner* — Jeffrey A Vonch
(74) *Attorney, Agent, or Firm* — Stinson LLP

(57) ABSTRACT

A gutter cover of color-coated expanded metal is disclosed. Openings in a center section of the gutter cover are defined by front strands and an opposing rear strands spaced rearward from respective front strands. Forward facing surfaces of the front and rear strands have a first color coating thereon, and rearward facing surfaces of the front and rear strands are free of the first color coating. A method of making the color-coated expanded metal gutter cover is disclosed.

25 Claims, 15 Drawing Sheets

(56) References Cited

U.S. PATENT DOCUMENTS

| | | | | |
|---|---|---|---|---|
| 2,319,225 | A * | 5/1943 | Grebe | E06B 7/08 52/670 |
| 2,998,226 | A | 8/1961 | Haas | |
| 4,292,358 | A * | 9/1981 | Fryer | E04B 1/941 427/173 |
| 4,881,307 | A * | 11/1989 | Gaissmaier | B21D 31/04 29/6.1 |
| 4,888,920 | A * | 12/1989 | Marulic | E04D 13/076 52/12 |
| 4,965,969 | A * | 10/1990 | Antenen | E04D 13/076 248/48.1 |
| 5,031,290 | A * | 7/1991 | Brereton | C23F 13/02 29/6.1 |
| 5,181,350 | A * | 1/1993 | Meckstroth | E04D 13/076 210/474 |
| 5,893,240 | A * | 4/1999 | Ealer, Sr. | E04D 13/076 248/48.2 |
| 5,956,904 | A * | 9/1999 | Gentry | E04D 13/076 210/474 |
| 6,151,837 | A * | 11/2000 | Ealer, Sr. | E04D 13/076 52/11 |
| 6,609,279 | B2 * | 8/2003 | Kogler | B21D 31/04 29/6.1 |
| 6,629,016 | B1 * | 9/2003 | Smith | B21D 31/043 29/6.1 |
| 6,672,012 | B2 * | 1/2004 | Bahroos | E04D 13/076 210/162 |
| D496,628 | S * | 9/2004 | Chiang | D12/608 |
| 7,627,991 | B1 * | 12/2009 | Feldhaus | E04D 13/076 210/155 |
| 8,146,218 | B1 * | 4/2012 | Ealer, Sr. | E04D 13/076 29/6.1 |
| 8,416,218 | B2 | 4/2013 | Marggraff et al. | |
| 8,595,985 | B1 * | 12/2013 | Feldhaus | E04D 13/076 52/12 |
| 2005/0166465 | A1 * | 8/2005 | Banks | E04D 13/076 52/11 |
| 2005/0204642 | A1 * | 9/2005 | Valentini | E04D 13/076 52/12 |
| 2005/0235577 | A1 * | 10/2005 | Smith | E04D 13/076 52/15 |
| 2006/0137168 | A1 * | 6/2006 | Futscher | B21D 31/04 29/527.2 |
| 2006/0179723 | A1 * | 8/2006 | Robins | E04D 13/076 52/11 |
| 2006/0230687 | A1 * | 10/2006 | Ealer, Sr. | E04D 13/076 52/12 |
| 2006/0283097 | A1 * | 12/2006 | Gregg | E04D 13/076 52/12 |
| 2008/0134587 | A1 * | 6/2008 | Ealer | E04D 13/076 52/12 |
| 2009/0000209 | A1 * | 1/2009 | Tenute | E04D 13/076 52/12 |
| 2009/0000210 | A1 * | 1/2009 | Barnett | E04D 13/076 52/12 |
| 2011/0041414 | A1 * | 2/2011 | Bell | E04D 13/076 52/12 |
| 2012/0144759 | A1 * | 6/2012 | Higginbotham | B01D 69/10 52/12 |
| 2015/0143756 | A1 * | 5/2015 | Higginbotham | E04D 13/076 52/12 |
| 2017/0089071 | A1 * | 3/2017 | Smith | E04D 13/076 |

FOREIGN PATENT DOCUMENTS

| | | | | |
|---|---|---|---|---|
| AU | 2007100177 A4 * | 4/2007 | | E04D 13/076 |
| DE | 1504401 A1 * | 10/1969 | | B29C 70/08 |
| DE | 8612531 U1 * | 7/1986 | | E04D 13/076 |
| DE | 3829384 A1 * | 3/1990 | | E04D 13/076 |
| DE | 4011036 A1 * | 10/1991 | | E04D 13/076 |
| DE | 9410289 U1 * | 8/1994 | | E04D 13/076 |
| EP | 1152099 A1 * | 11/2001 | | E04D 13/176 |
| FR | 2659371 A1 * | 9/1991 | | E04D 13/076 |
| JP | 64051172 A * | 2/1989 | | E04D 13/076 |
| JP | 03002387 A * | 1/1991 | | C23F 13/02 |
| JP | 2002035861 A * | 2/2002 | | |
| JP | 2010189926 A * | 9/2010 | | |
| SE | 434483 B * | 7/1984 | | E04D 13/076 |
| WO | WO-9837289 A1 * | 8/1998 | | E04D 13/076 |
| WO | WO-9953157 A1 * | 10/1999 | | E04D 13/064 |

OTHER PUBLICATIONS

Machine Translation for EP 1152099 A1, Nov. 2001 (Year: 2001).*
Machine Translation for JP 2002035861 A, Feb. 2002 (Year: 2002).*
Amico, Architectural Concepts Guide, Jun. 2010 (Year: 2010).*
Gutter Guardian Australia, Gutter Guardian, Jul. 2013 (Year: 2013).*
Amico, Fabricated Products, Nov. 2014 (Year: 2014).*
Prior art identified in Figures 1, 2 and 3 and paragraphs [0003]-[0005] of U.S. Appl. No. 15/005,160, filed Jan. 25, 2016.

* cited by examiner

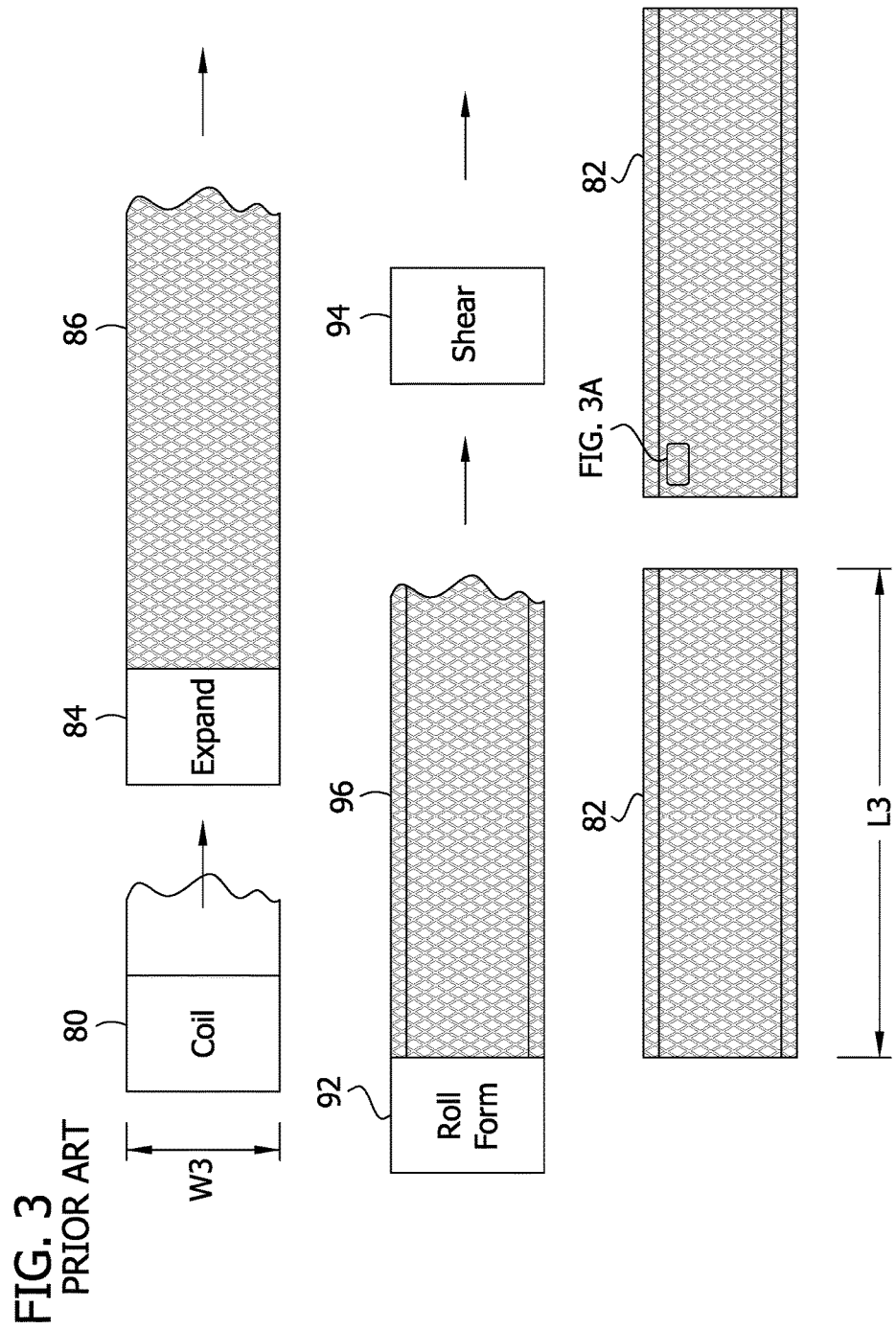

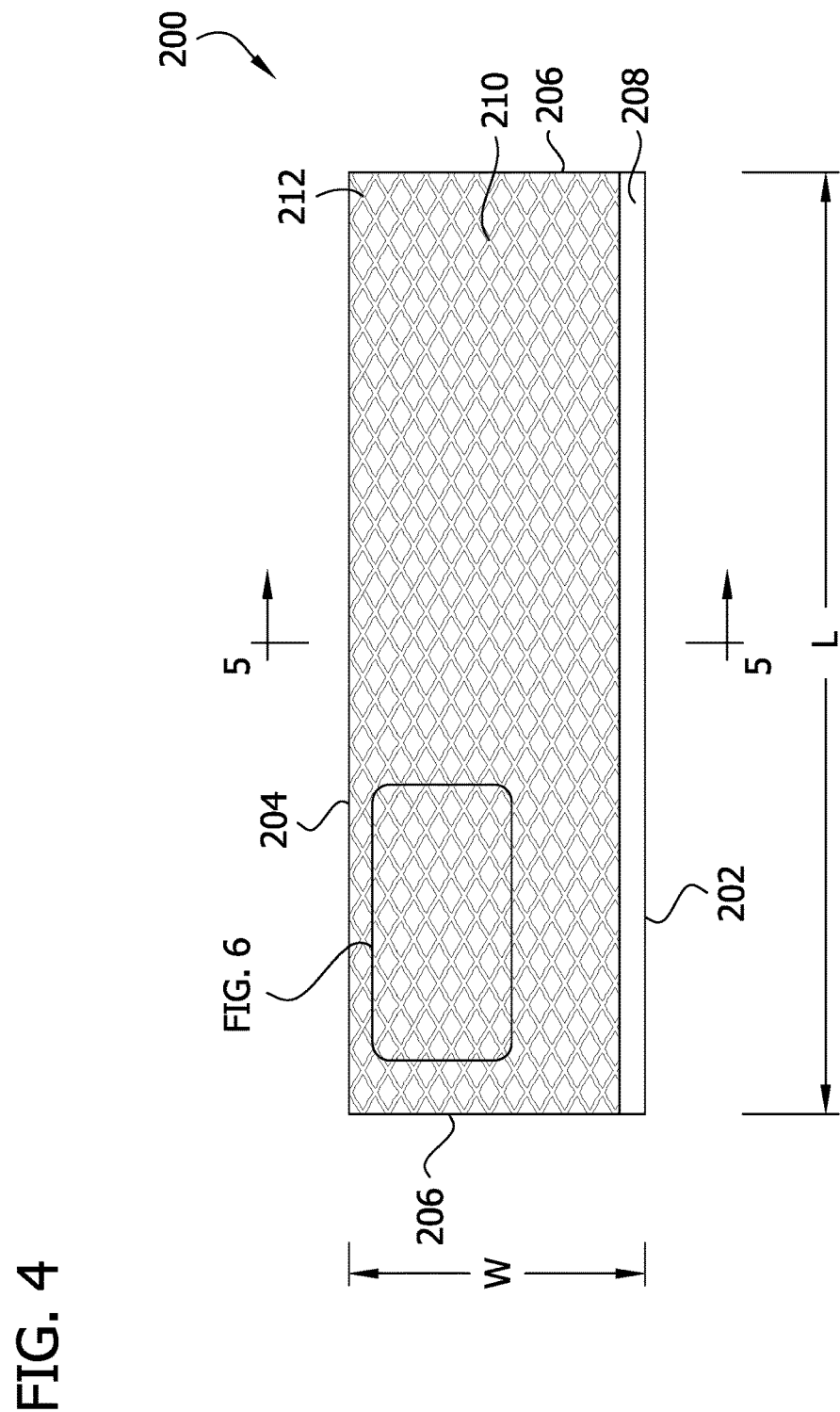

COLOR-COATED GUTTER COVER OF EXPANDED METAL AND METHOD OF MANUFACTURE

FIELD OF THE INVENTION

The present invention generally relates to gutter covers and more particularly to metal gutter covers which are color-coated.

BACKGROUND OF THE INVENTION

There are different types of metal gutter covers, including solid metal covers made from sheet metal punched or slit at desired locations to form drain holes, and expanded metal covers made from sheet metal expanded to form an open mesh of strands defining the drain holes.

It is conventional to make solid metal gutter covers of different colors, e.g., colors selected to match the colors of the gutters on which the covers are to be installed. Typically, a coating of selected color is applied to a strip of sheet aluminum at the mill. The strip is then wound into a coil and shipped to a location for manufacture of the solid metal gutter covers. FIG. 1 illustrates a conventional method of making solid gutter covers from a color-coated strip of sheet aluminum. In this method, a coil 20 of the color-coated sheet metal having a width W1 is used to make finished gutter covers 22 having a length L1. The process involves feeding a strip 24 of sheet metal from the coil along a path to a punching or slitting mechanism 26 which forms drain holes 28 in the strip; then to a bending (e.g., roll-forming) mechanism 34 which bends the perforated strip to have the desired gutter cover contour; and then to a shearing mechanism 40 which cuts the contoured and perforated strip into individual covers 22 of desired length. The finished covers 22 have a width substantially equal to or somewhat less than the width W1 of the coil 20 due to the roll-forming step in the above process. The resulting color-coated solid metal gutter covers 22 are then distributed for installation.

On the other hand, gutter covers of expanded metal are not made of different colors. In this regard, FIG. 2 illustrates a conventional process for making such covers. In this process a coil 50 of sheet steel having a width W2 is used to make finished gutter covers 52 having a length L2 substantially equal to the coil width W2. The sheet steel is typically galvanized steel with no color-coating. The process involves an expanding mechanism 54 which expands sheet steel unwound from the coil to form a continuous strip 56 of expanded metal. One such conventional expanding mechanism is available from Wanzhi Wire Mesh Machine (Shenzhen) Ltd. in Shenzhen City of Guangdong Province, China, Model 1500 mm. The mechanism 54 expands (stretches) the sheet metal in a direction extending lengthwise of the strip 56 to form an open mesh of strands 58 (see FIG. 2A) defining diamond-shaped openings 60 each of which has a long axis dimension LD extending widthwise of the strip 56 and a short axis dimension SD extending lengthwise of the strip 56. The formation of these strands 58 exposes large areas of bare (uncoated) steel which necessitates a later coating of a suitable rust-inhibitor. After the expansion step, the continuous strip 56 is fed to a shearing mechanism 64 which cuts the strip 56 into individual strips 66 having length L2. The individual strips 66 are transported to a roll forming mechanism 68 where they are fed lengthwise into the mechanism and bent to form uncoated gutter covers 70 of desired contour. In a final step, the covers 70 are delivered to a powder-coating station 72 where they are powder coated to inhibit rust. The powder coating is usually black in color. While coatings of different colors could be applied to different covers, this would require separate powder-coating facilities, one for each color, which would be very expensive.

FIG. 3 illustrates a traditional process for making expanded metal gutter covers from sheet aluminum. In this process, a coil 80 of uncoated sheet aluminum having a width W3 is used to make finished gutter covers 82. In the process of FIG. 3, an expanding mechanism 84 expands sheet aluminum from the coil 80 to form a continuous strip 86 of expanded metal. An exemplary expanding mechanism is the one described above for use in making expanded steel covers. The mechanism 84 expands (stretches) the sheet aluminum in a direction extending lengthwise of the strip 86 to form a mesh of strands 88 (see FIG. 3A) defining diamond-shaped openings 90 each of which has a long axis dimension LD extending widthwise of the strip 86 and a short axis dimension SD extending lengthwise of the strip 86. After the expansion step, the continuous strip 86 is fed to a roll-forming mechanism 92 which bends the strip 80 to form a continuous contoured strip 96 having the desired gutter cover contour, and to a shearing mechanism 94 for cutting the contoured strip 96 into the individual covers 82 of desired length L3. The finished covers 82 have a width substantially equal to or somewhat less than the width W3 of the coil 20 due to the roll-forming step in the above process. The finished covers 82 are typically of bare metal and not color-coated.

In view of the foregoing, there is a need for an efficient and economical way to make expanded metal gutter covers (e.g., of aluminum or steel) which can be efficiently and economically manufactured in different colors selected, for example, to match the gutters on which they are to be installed.

SUMMARY OF THE INVENTION

In one aspect, this invention is directed to a gutter cover of expanded metal. The gutter cover has a length, a width, a front side, a rear side, and opposite ends. The gutter cover further comprises a front section extending lengthwise of the gutter cover, a center section extending lengthwise of the gutter cover, and a rear section extending lengthwise of the gutter cover. Openings in the center section of the gutter cover are defined by expanded aluminum strands connected by bonds. Each opening is defined by a front strand toward the front side of the gutter cover and an opposing rear strand spaced rearward from the front strand toward the rear side of the gutter cover. The front strands of the openings comprise generally forward facing surfaces and generally rearward facing surfaces, and the rear strands of the openings comprise generally forward facing surfaces and generally rearward facing surfaces. The forward facing surfaces of the front, and rear strands have a first color coating thereon and the rearward facing surfaces of the front and rear strands are free of the first color coating.

In another aspect, this invention is directed to a method of making expanded metal gutter covers. The method comprises providing an elongate strip of solid sheet metal having a top face, a bottom face, and opposite side edges along the strip. At least the top face of the strip has a top color coating thereon comprising a first color. The method further comprises expanding the coated strip to form metal strands defining openings, forming the expanded coated strip to have a gutter cover configuration, and cutting the expanded and formed coated strip to make individual gutter covers.

In still another aspect, this invention is directed to a method of making expanded metal gutter covers having different colors for installation on gutters having corresponding different colors. The method comprises providing an elongate first strip of solid sheet metal. The first strip has a length, a width, opposite top and bottom faces, and opposite side edges along the first strip. At least the top face of the first strip has a top coating comprising a first color. The method further comprises expanding the first strip to form metal strands defining first openings, forming the expanded first strip to have a first gutter cover configuration, and cutting the expanded and formed first strip to make individual first gutter covers. The method also involves providing an elongate second strip of solid sheet metal, the second strip having a length, a width, opposite top and bottom faces, and opposite side edges along the second strip, at least the top face of the second strip having a top coating comprising a second color different from said first color. The method further comprises expanding the coated second strip widthwise of the second strip to form metal strands having second openings therein, forming the expanded second strip to have a second gutter cover configuration the same as or different from the first gutter cover configuration, and cutting the expanded and formed second strip to make individual second gutter covers. The first gutter covers are adapted to be installed on one or more gutters having a first matching color substantially matching the first color, and the second gutter covers are adapted to be installed on one or more gutters having a second matching color substantially matching the second color.

Other objects and features will be in part apparent and in part pointed out hereinafter.

BRIEF DESCRIPTION OF THE DRAWINGS

FIG. 3 is a schematic illustration of a prior art method of making expanded aluminum gutter covers;

FIG. 4 is a top plan view of an exemplary gutter cover of this invention;

Corresponding reference characters indicate corresponding parts throughout the drawings.

DETAILED DESCRIPTION

Figure 1:
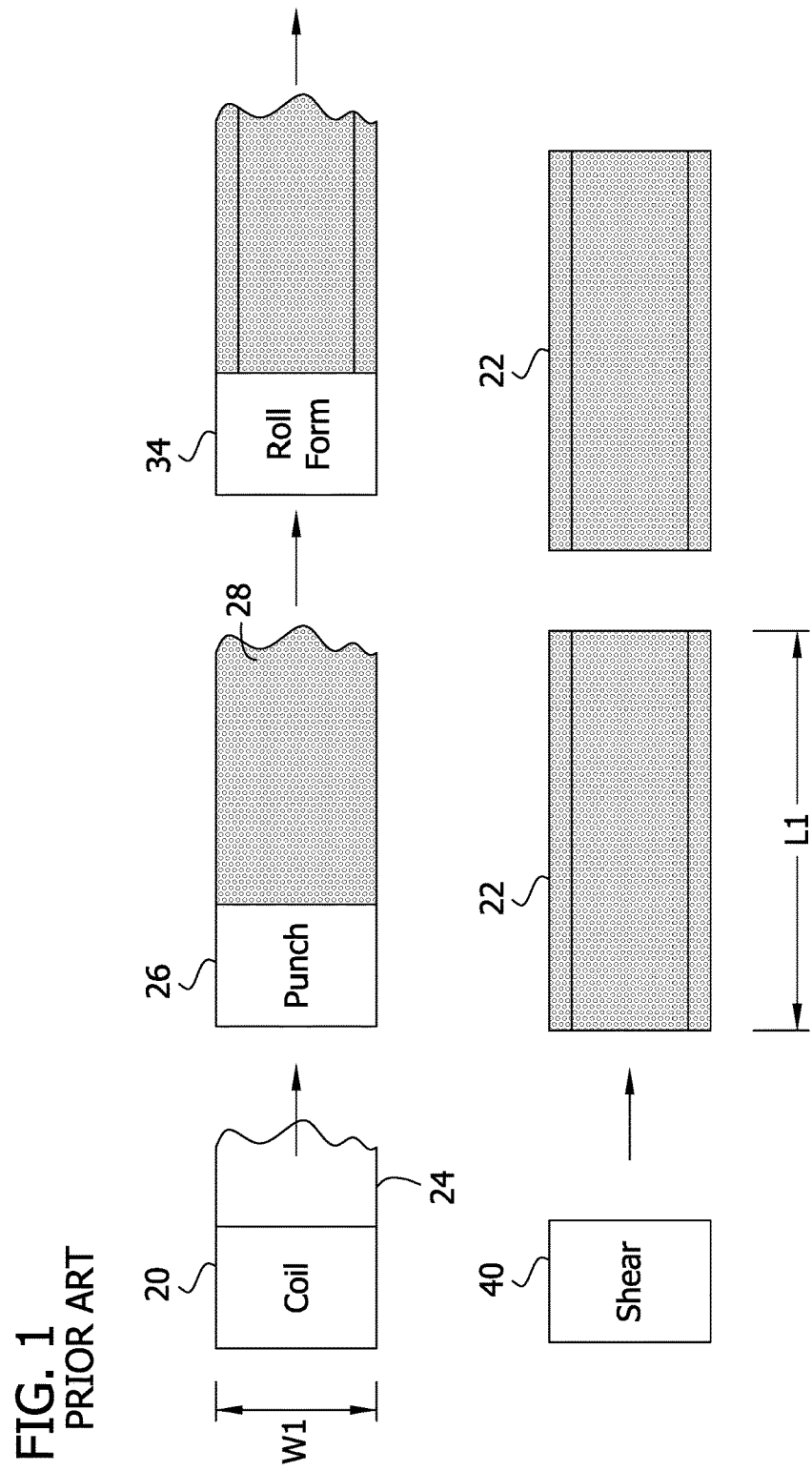
FIG. 1 is a schematic illustration of a prior art method of making solid steel gutter covers.

Referring now to the drawings, FIGS. 4-7 illustrate an exemplary expanded metal gutter cover of this invention, generally designated 200. In general, the gutter cover has a length L, a width W, a front side 202, a rear side 204, and opposite (left and right) ends 206. The cover comprises a front section or margin 208 extending lengthwise of the gutter cover at the front side 202 of the cover, a center section 210 extending lengthwise of the gutter cover, and a rear section or margin 212 extending lengthwise of the gutter cover at the rear side 204 of the cover. The cover 200 is adapted to be mounted on a gutter 216 supported by a gutter hanger 218, as shown for example in FIG. 8, where the front section 208 engages a flange 220 at the front of the gutter; the center section 210 overlies the gutter; and the rear section 212 engages a rear section of the gutter hanger 218. The front, center, and rear sections 208, 210, 212 of the gutter cover 200 may have other configurations. By way of example but not limitation, the front section 208 of the gutter cover 200 may be configured to engage the front wall of the gutter 216 or the front section of the hanger 218 supporting the gutter, and the rear section 212 of the cover 200 may be configured to fit under the shingles 224 on a roof of the building on which the gutter 216 is mounted.

Figure 6:
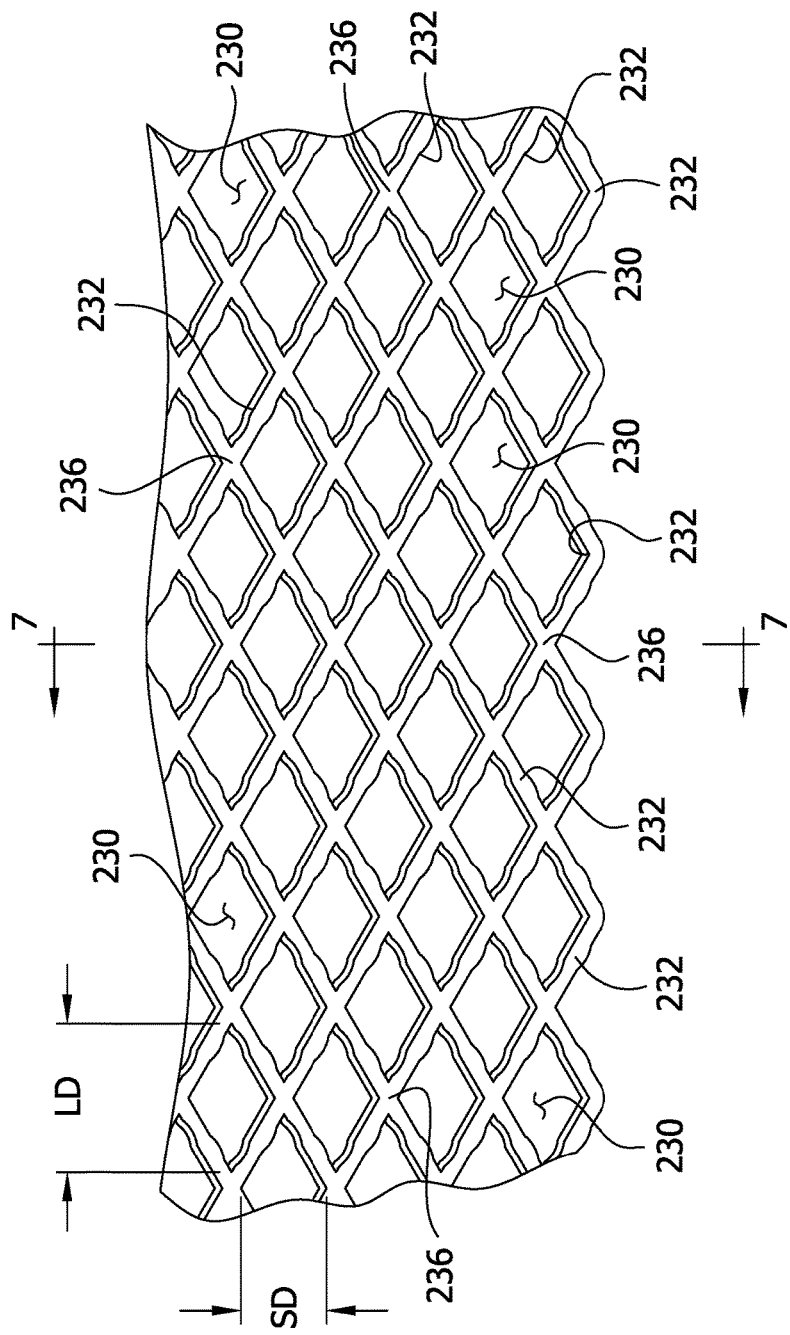
FIG. 6 is an enlarged portion of FIG. 5 showing the long and short dimensions of openings in the gutter cover of FIG. 4.
Figure 7:
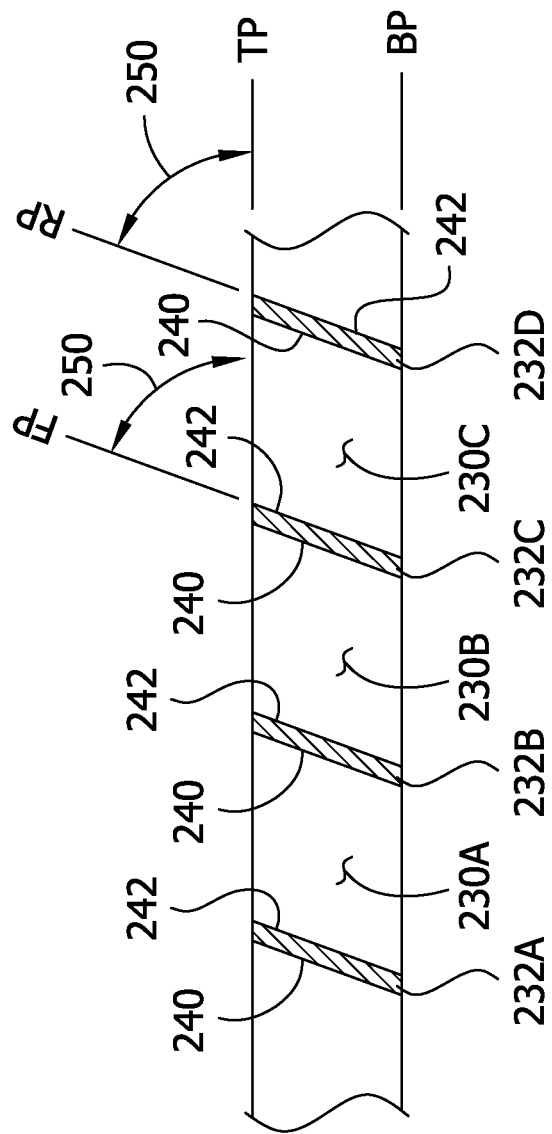
FIG. 7 is an enlarged cross section taken in a plane defined by lines 7-7 of FIG. 6

In the embodiment of FIGS. 4-8, the front section 208 of the cover 200 is of solid metal, and the center and rear sections 210, 212 of the cover are formed as a mesh of expanded metal in which openings 230 are defined by expanded metal strands 232 connected by bonds 236, as illustrated in FIG. 6. Each opening 230 is defined by two opposing strands 232, namely, a front strand toward the front side 202 of the gutter cover and a rear strand spaced rearward from the front strand in a direction toward the rear side 204 of the gutter cover. For example, FIG. 7 is a cross-sectional view of the cover 200 illustrating three such openings 230A, 230B, and 230C. Opening 230A is defined by a front strand 232A toward the front side 202 of the gutter cover and a rear strand 232B spaced rearward (to the right) from of the front strand in a direction toward the rear side 204 of the gutter cover. Opening 230B to the rear of opening 230A is defined by the strand 232B and a strand 232C spaced rearward (to the right) from the strand 232B. Thus, strands 232B and 232C may be referred to as the front and rear strands, respectively, defining the opening 232B. Similarly, opening 230C to the rear of opening 230B is defined by the strand 232C and a strand 232D spaced rearward (to the right) from the strand 232C. Thus, strands 232C and 232D may be considered the front and rear strands, respectively, defining the opening 232C.

As illustrated best in FIGS. 4 and 6, the openings 230 are generally elongate, each having a long axis dimension LD extending lengthwise of the gutter cover, i.e., substantially parallel to the length L of the cover 200 and to the length of the gutter 216 on which the cover is to be installed, and a short axis dimension SD extending widthwise of the gutter cover, i.e., substantially perpendicular to the length of L of the cover and to the length of the gutter on which the gutter cover is to be installed.

Referring again to FIG. 7, the front and rear strands 232 defining the openings 230 in the center and rear sections 210, 212 of the gutter cover 200 comprise generally forward facing surfaces 240 and generally rearward facing surfaces 242. The front and rear strands 232 defining each opening 230 lie in respective front and rear planes FP, RP that are inclined relative to top and bottom planes TP, BP defining top and bottom surfaces of the center section 210 of the gutter cover. In the illustrated embodiment, these planes TP, BP are substantially parallel. The angle of inclination 250 generally falls within the range of 10-90 degrees, more preferably about 30-60 degrees, and still more preferably about 45 degrees. In FIG. 7, the angle of inclination 250 of the front and rear strands 232 of adjacent openings 230A, 230B, 230C are substantially equal. In other embodiments, the angle of inclination 250 of the front strand 232 defining a particular opening 230 may differ from the angle of inclination of the rear strand 232 defining that same opening, and/or the angle of inclination of the strands may vary as between different openings, e.g., openings 230A, 230B, 230C.

Figure 8:
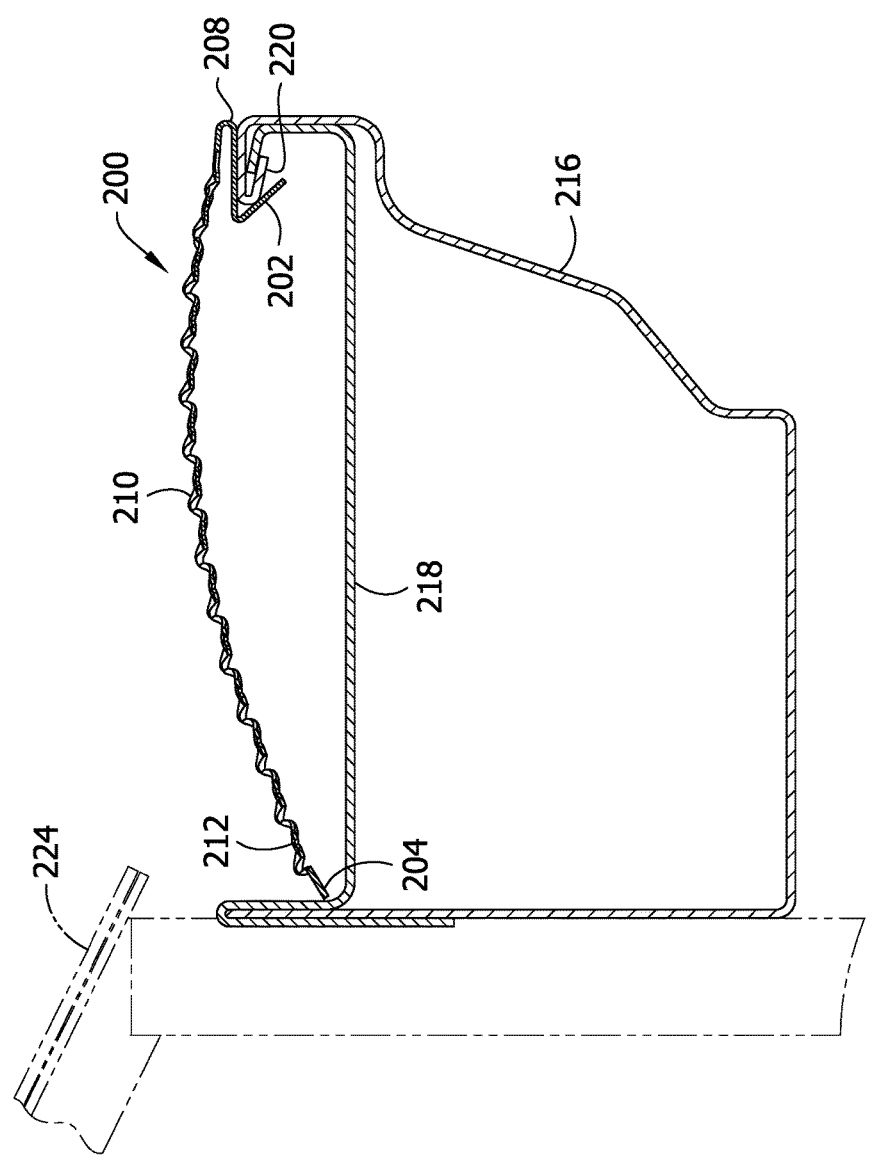
FIG. 8 is an elevational view of the gutter cover of FIG. 4 mounted on a gutter.
Figure 9:
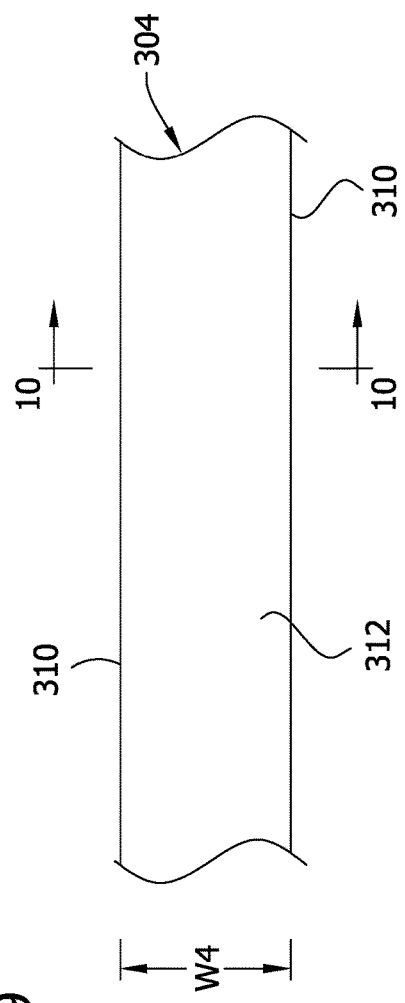
FIG. 9 is a plan view of an exemplary strip of color-coated sheet metal used to make an exemplary gutter cover of this invention.

The forward facing surfaces 240 of the strands 232 of the center and rear sections 210, 212 of the gutter cover 200 have a color coating thereon (described hereinafter) and the rearward facing surfaces 242 of the strands 232 of the center section are free of the color coating. Desirably, the corresponding forward and rearward facing surfaces 240, 242, of the strands 232 defining each opening 230 in the front section 208 of the gutter cover 200 have the same color coating (or lack of color coating) thereon. Due to the orientation of the gutter cover 200 on the gutter 216, the color-coated forward-facing surfaces 240 of the strands 232 are visible by persons positioned toward the front side 202 and ends 206 of the gutter cover, and the rearward-facing surfaces 242 (not color-coated) are substantially invisible to such persons. As a result, when the gutter cover 200 is mounted on a gutter 216, as shown in FIG. 8, the gutter cover has the desired color as viewed from its front side 202 and ends 206, with very little if any color degradation due to the uncoated rearward-facing surfaces 242 of the strands.

The color coating on the front surfaces 240 can be of any color, including but not limited to black.

In the embodiment of FIG. 4 only the center and rear sections 210, 212 of the color-coated gutter cover 200 are formed with expanded metal openings 230. The front section 208 is formed of solid (non-expanded) metal. However, in another embodiment, the front, center, and rear sections 208, 210, 212 of the color-coated gutter cover are all formed with expanded metal openings. In still another embodiment, only the center section 210 of the cover is formed with expanded metal openings, the front and rear sections 208, 212 of the cover being formed from solid (non-expanded) metal.

Figure 10:
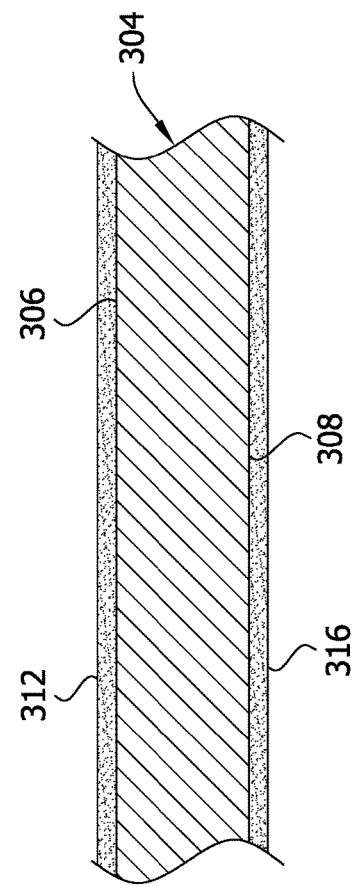
FIG. 10 is an enlarged cross section taken in a plane defined by lines 10-10 of FIG. 9.

FIGS. 9-12 illustrate an exemplary method of making the gutter cover 200. The method starts with a step of providing an elongate strip 304 of solid sheet metal (e.g., steel or aluminum). The strip has a width W4, a top face 306, a bottom face 308, and opposite side edges 310 extending lengthwise along the strip (see FIGS. 9 and 10). The strip 304 is color-coated to have a color selected to substantially match the color of a gutter on which the cover is to be installed. In particular, at least the top face 306 of the strip 304 has a top color layer or coating 312 comprising a first color. Desirably, the top color coating 312 extends the full width W4 of the strip. The top color coating 312 may be a layer of paint, film, or other material having the desired color. The top coating 312 has an appropriate thickness, e.g., in the range of 0.001-0.05 in. Optionally, as shown in FIG. 10, the bottom face 308 of the strip 304 has a bottom coating 316. This coating 316 may be a color coating comprising the same color as the first color and/or a second different color. Alternatively, the bottom coating 316 may be a non-color coating, e.g., a protective coating protecting against the formation of rust.

Figure 11:
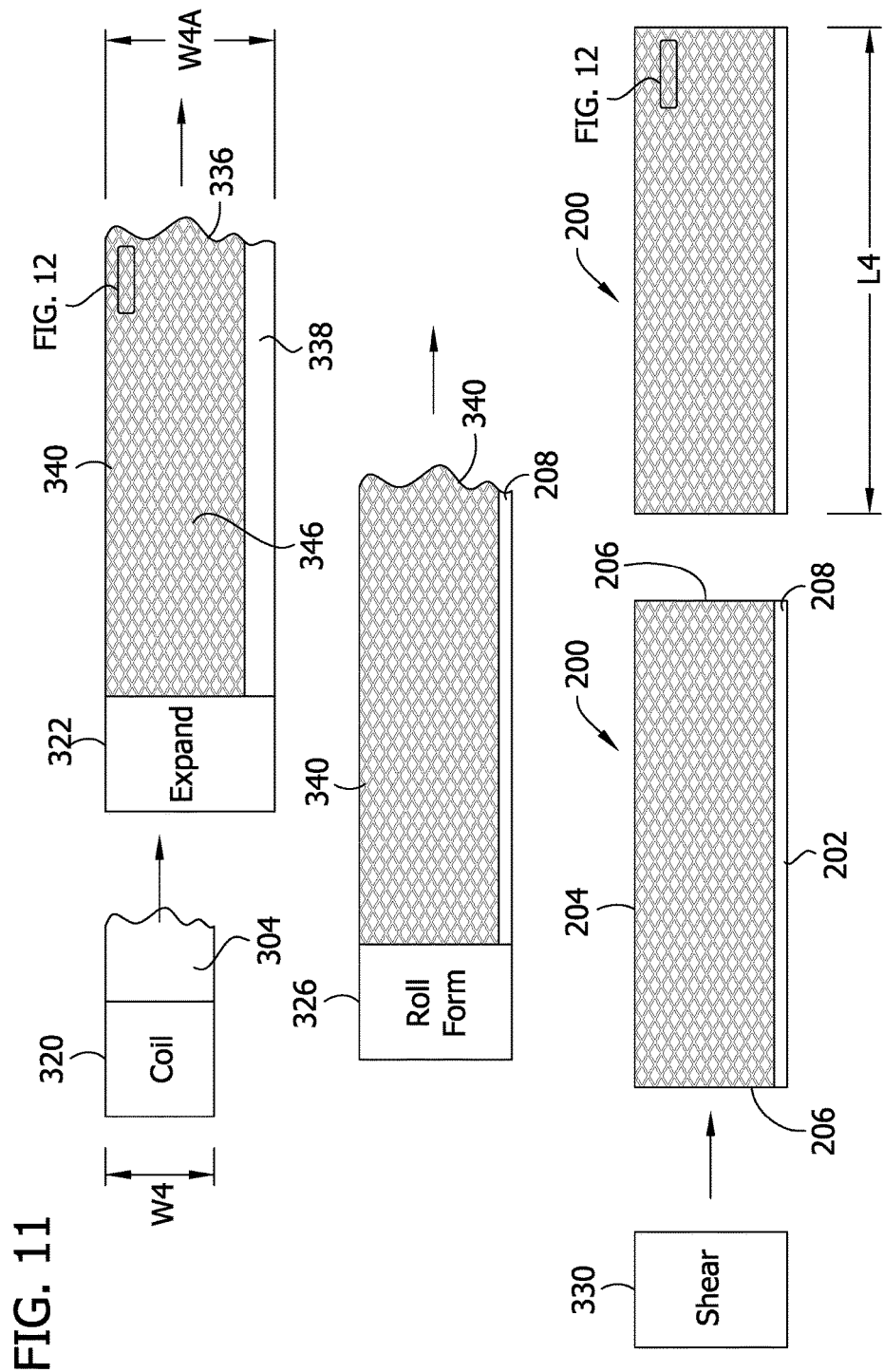
FIG. 11 is a schematic illustration of an exemplary method of making expanded color-coated gutter covers in accordance with this invention.
Figure 12:
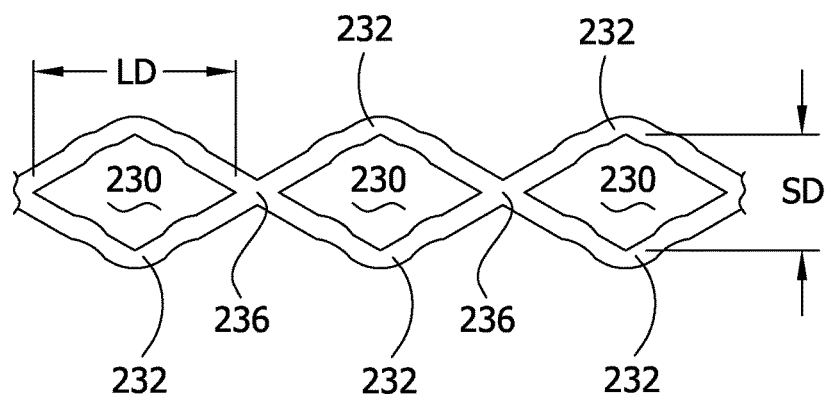
FIG. 12 is an enlarged portion of FIG. 11 showing the long and short dimensions of expanded metal openings in the gutter cover of FIG. 11.

Referring to FIG. 11, the coated strip 304 is wound into a coil 320 having width W4. The strip is fed from this coil along a path in which it is subjected to an expanding step at 322, a forming step at 326, and a cutting step at 330. These steps are described in detail below.

Figure 13:
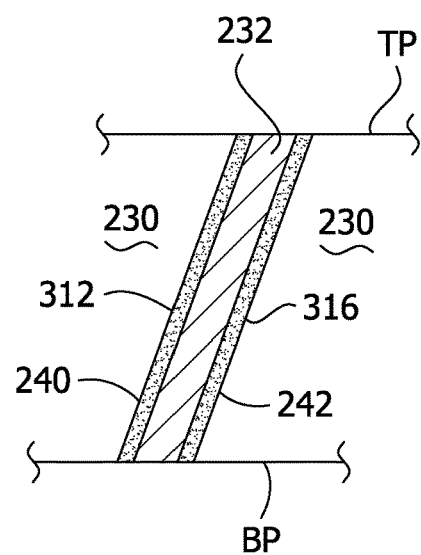
FIG. 13 is an enlarged cross sectional view showing coated surfaces of an exemplary strand of an expanded metal opening formed in the method of FIG. 11.

In the expanding step 332 an expander (also designated 332) expands the coated metal strip 304 as it is fed from the coil 320 to form an expanded metal strip 336 having metal strands 232 connected by bonds 236 defining the openings 230 described above (see FIG. 12). During the expanding process, the coated strip 304 is cut and deformed such that the forward facing surface 240 of each metal strand 232 comprises the color coating 312, and the rearward facing surface 242 comprises the coating 316 or, alternatively, is simply bare metal (see FIG. 13).

Figure 2:
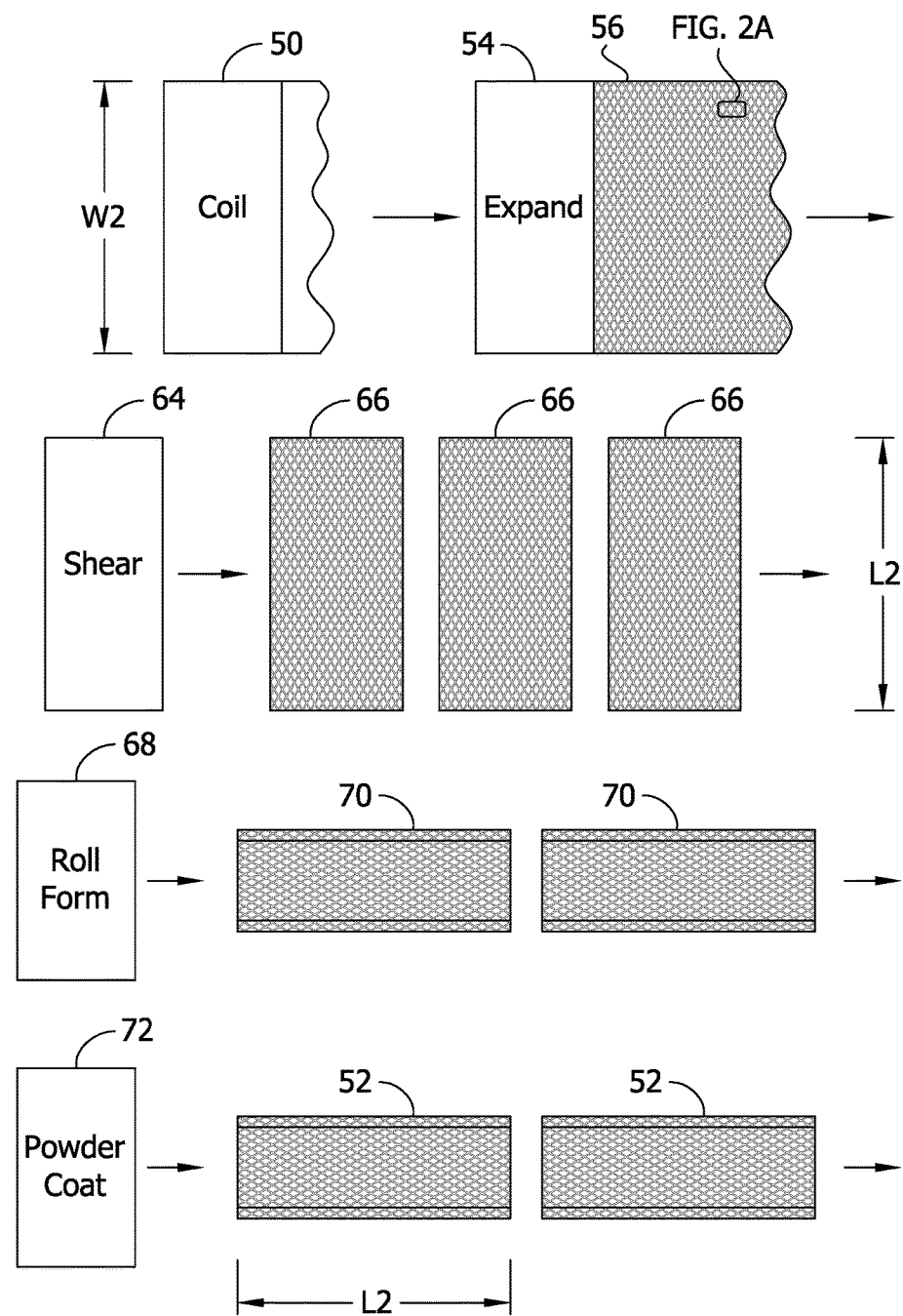
FIG. 2 is a schematic illustration of a prior art method of making expanded steel gutter covers.
Figure 2A:
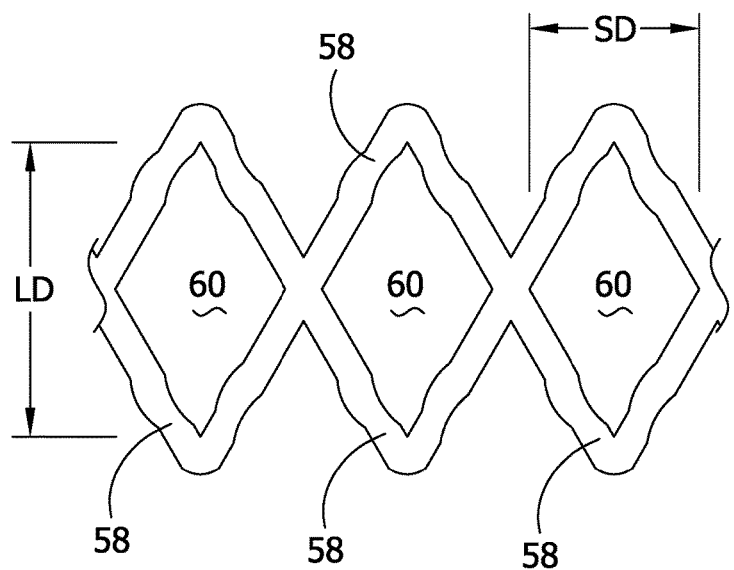
FIG. 2A is an enlarged portion of FIG. 2 showing the long and short dimensions of openings in a gutter cover made using the method of FIG. 2.
Figure 3A:
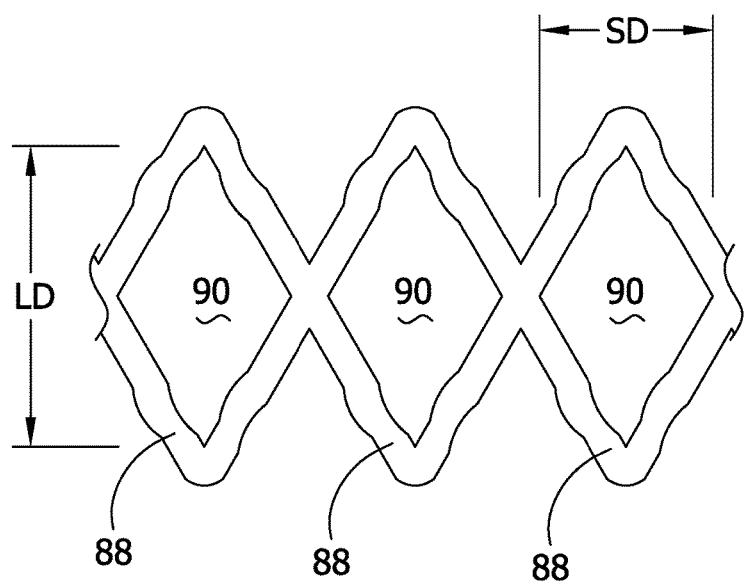
FIG. 3A is an enlarged portion of FIG. 3 showing the long and short dimensions of openings in a gutter cover made using the method of FIG. 3.
Figure 5:
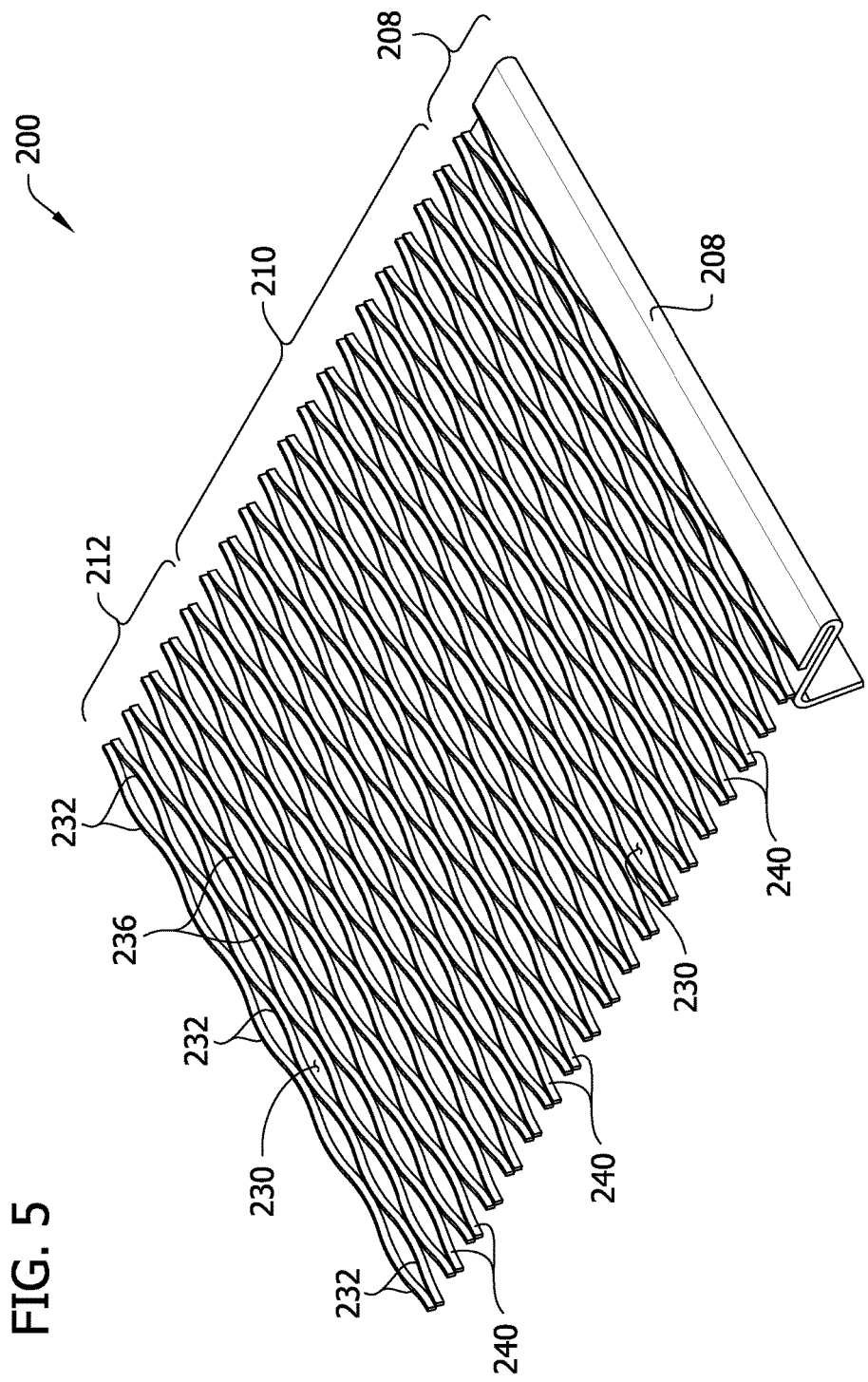
FIG. 5 is a front perspective of the gutter cover of FIG. 4.

Desirably, the expander 322 expands the metal strip 304 widthwise of the strip as described in detail in my U.S. Pat. No. 8,416,218, which is incorporated by reference herein. As a result, the expanded metal strip 336 has a width W4A substantially greater than the width W4 of the coil. Expansion in the widthwise direction contrasts with the prior conventional methods of FIGS. 2 and 3 where expansion is in a direction extending lengthwise of the metal strip, and where the width of the expanded metal strip is substantially the same as the width of the coil from which the strip is fed.

Optionally, as described in my U.S. Pat. No. 8,416,218, certain areas of the metal strip 336 may remain solid (not expanded) after the expanding step. For example, the front edge margin 338 of the strip 336 (corresponding to all or part of the front section 208 of the finished gutter cover 200) may remain solid after passing through the expander 322. The front edge margin 338 may, for example, have a width of at least about 1/16 in., or at least about 1/4 in., or at least about in, or at least about 3/4 in., or at least about 1.0 in., or at least about 1½ in. or more. Similarly, other areas of the strip 336 extending lengthwise of the strip may remain solid after the expansion step, including the rear edge margin 340 of the strip 336 (corresponding to the rear section 212 of the finished cover). Desirably, however, at least the center section of the strip 346 (corresponding to the center section 210 of the finished gutter cover 200) is expanded to create the aforementioned openings 230 defined by front and rear strands 232 having color-coated forward-facing surfaces 240.

After the expansion step, the expanded metal strip 336 is formed at step 326 by suitable bending equipment (e.g., a roll forming mechanism, also designated 326) to make a continuous strip 340 of expanded metal having a transverse cross-sectional shape corresponding to the desired gutter cover configuration. In particular, one or both of the two side edge margins of the strip 340 are bent to form the front and rear sections 208, 212 of the final gutter cover 200. By way of example but not limitation, the front edge margin 338 of the expanded strip 336 may be bent to form a front section 208 having the configurations shown in FIG. 5. Other configurations are possible. Optionally, one or both of the side edge margins may remain unformed, as in FIG. 5 where the rear section 212 of the gutter cover remains unbent and flat.

In a final step, the expanded and formed metal strip 340 is cut at step 330 by suitable cutting equipment (e.g., a shearing device, also designated 330) to make individual gutter covers 200. As described above, the forward facing surfaces 240 of the front and rear strands 232 defining the openings 230 in the center sections 210 of the gutter covers 200 have the color coating 312 thereon and the rearward facing surfaces 242 of these same strands 232 have the coating 316 thereon, or are free of a coating. When the gutter cover is mounted on a gutter (e.g., gutter 216 in FIG. 8), the long axis dimensions LD of the openings 230 extend lengthwise of the gutter cover 200 and parallel to the length of the gutter 216. As a result, the color-coated forward-facing surfaces 240 of the strands 232 of at least the center section 210 of the gutter cover 200 are visible from the front side 202 and opposite ends 206 of the gutter cover 200, and the rearward-facing surfaces 242 (not color-coated) of these same strands 232 are substantially invisible from these locations, thus providing the gutter cover with the desired appearance of having a color matching the color of the gutter. Having described the invention in detail, it will be apparent that modifications and variations are possible without departing from the scope of the invention defined in the appended claims.

Figure 14:
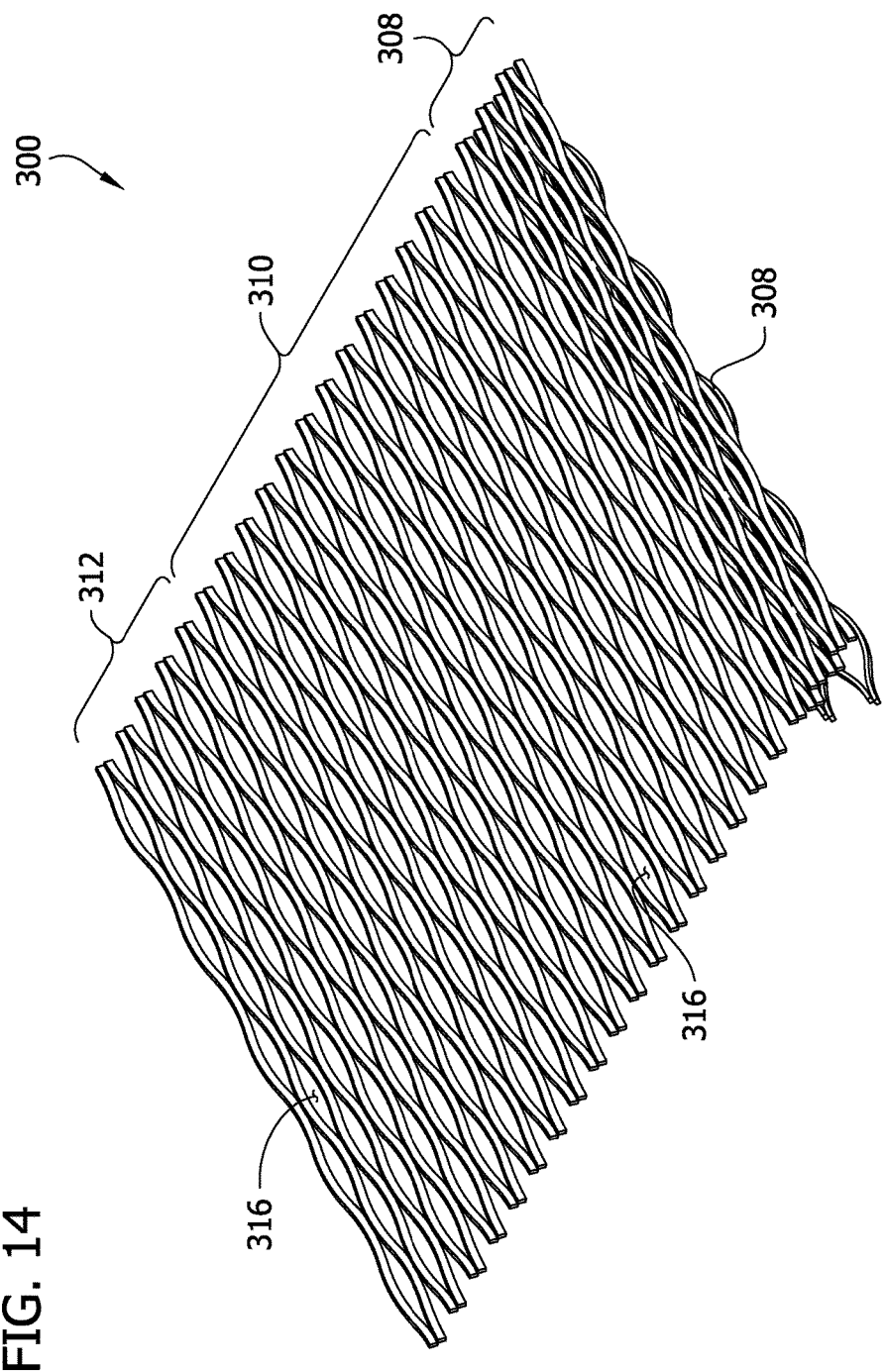
FIG. 14 is a perspective of a second exemplary embodiment of a gutter cover of this invention.

FIG. 14 illustrates color-coated gutter cover 300 essentially identical to the gutter cover 200 described above except that the front section 308, center section 310, and rear section 312 of the cover are all formed as expanded metal defining expanded metal openings 316. None of the sections 308, 310, 312 are of formed as solid (non-expanded) metal.

Figure 15:
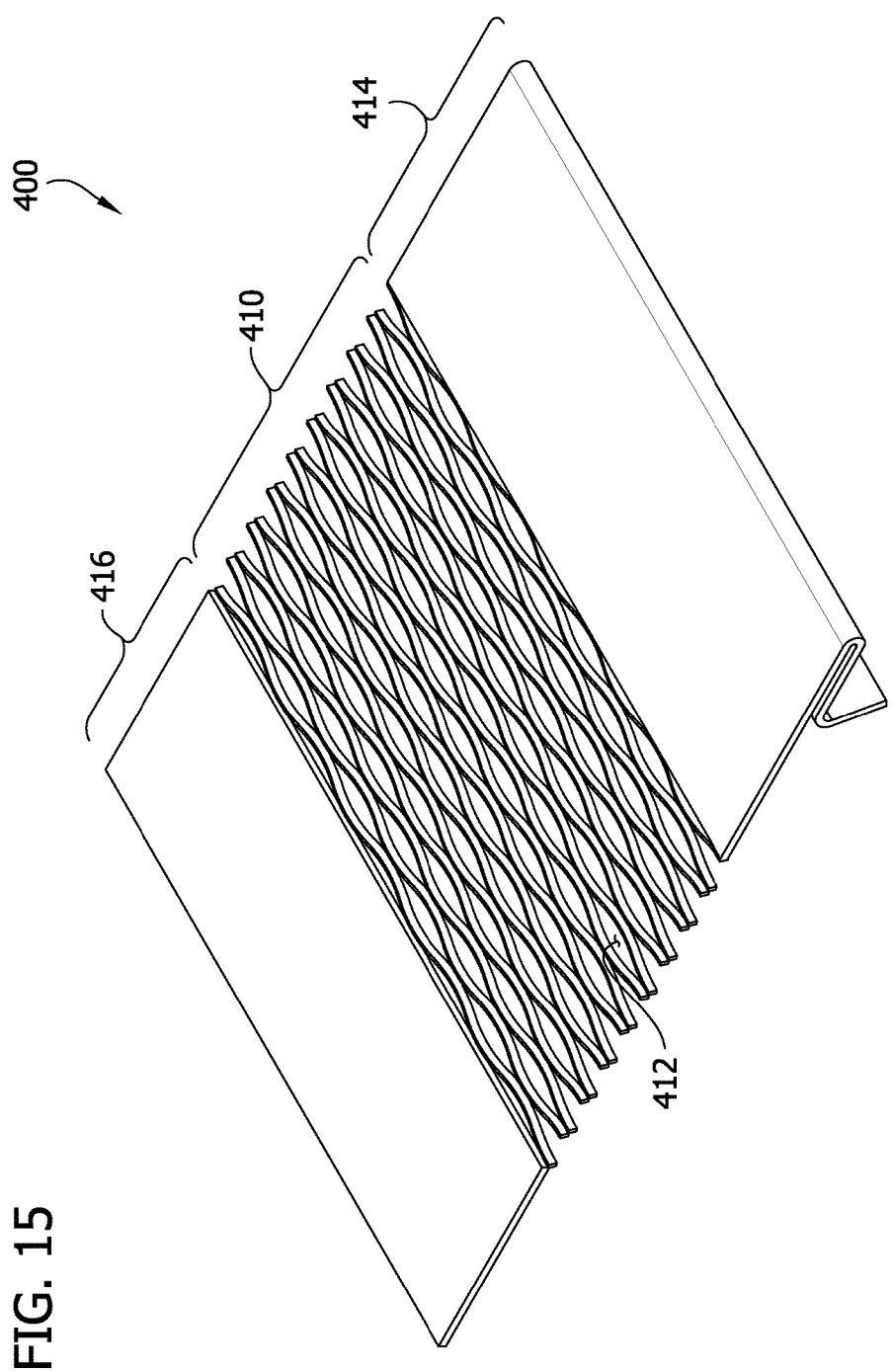
FIG. 15 is a perspective of a third exemplary embodiment of a gutter cover of this invention.

FIG. 15 illustrates color-coated gutter cover 400 essentially identical to the gutter cover 200 described above except that only the center section 410 is of expanded metal defining expanded metal openings 412. The front section 414 and rear section 416 of the gutter cover are of solid (non-expanded) metal.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods, without departing from the scope of the invention, it is intended that all matter contained in the above description and shown in the accompanying drawings shall be interpreted as illustrative and not in a limiting sense.

What is claimed is:

1. A gutter cover of expanded metal, the gutter cover having
   a length, a width, a front side, a rear side, and opposite ends, the gutter cover configured to be installed on a gutter in an installed orientation in which the rear side is adjacent a roof and the front side is adjacent a front of the gutter away from the roof, the gutter cover further comprising
   a front section extending lengthwise of the gutter cover,
   a rear section extending lengthwise of the gutter cover,
   a center section extending lengthwise of the gutter cover between the front section and the rear section, the center section having top and bottom surfaces and comprising a plurality of expanded openings defined by metal strands connected by bonds, each opening having a front edge defined by a front strand toward the front side of the cutter cover and a rear edge defined by an opposing rear strand spaced rearward from the front strand toward the rear side of the gutter cover,
   the front strands of the openings comprising generally forward facing surfaces and generally rearward facing surfaces when the gutter cover is in the installed orientation,
   the rear strands of the openings comprising generally forward facing surfaces and generally rearward facing surfaces when the gutter cover is in the installed orientation, and
   wherein the forward facing surfaces of the front and rear strands have a first color coating thereon and the rearward facing surfaces of the front and rear strands are free of the first color coating;
   wherein the generally forward facing surfaces of the front strands and the generally rearward facing surfaces of the rear strands are arranged to be inclined relative to the top and bottom surfaces of the center section of the gutter cover when the gutter cover is in the installed orientation;
   wherein the rearward facing surface of the front strand of each opening is arranged to face generally across the respective opening toward the rear strand of the respective opening and toward the roof when the gutter cover is in the installed orientation, and the forward facing surface of the rear strand of each opening is arranged to face generally across the respective opening toward the front strand of the respective opening and away from the roof when the gutter cover is in the installed orientation; and
   wherein at least the front section and the center section are integrally formed from a single piece of metal and the front section defines a recess extending lengthwise of the gutter cover and configured to receive a front flange of the gutter therein to secure the gutter cover to the gutter in the installed orientation in which the top surface faces generally upward away from the gutter and the bottom surface faces generally downward and toward the gutter, the recess being offset vertically from the top surface of the center section in the installed orientation.

2. The gutter cover of claim 1, wherein said openings are elongate, each opening having a long axis dimension extending lengthwise of the gutter cover and a short axis dimension less than the long axis dimension extending widthwise of the gutter cover.

3. The gutter cover of claim 1, wherein the recess is offset below the top surface of the center section in said installed orientation.

4. The gutter cover of claim 1, wherein the front and rear strands are inclined in the rearward direction.

5. The gutter cover of claim 1, wherein the front, center and rear sections of the gutter cover are integrally formed from one piece of sheet metal, and wherein the front section comprises a solid front edge margin substantially free of openings defined by expanded metal strands, said solid front edge margin having a width of at least about 1/16 in.

6. The gutter cover of claim 1, wherein the gutter cover is formed from a single piece of metal.

7. The gutter cover of claim 2, wherein the metal is aluminum.

8. The gutter cover of claim 1, wherein the first color coating is paint and wherein the rearward facing surfaces of the front and rear strands have a protective coating thereon that is not paint.

9. The gutter cover of claim 8, wherein the forward facing surfaces of the front and rear strands are free of said protective coating that is not paint.

10. The gutter cover of claim 1, wherein the gutter cover is roll-formed.

11. The gutter cover of claim 1, wherein the rearward facing surfaces of the front and rear strands have a second coating thereon that has a color and a composition different from the color and a composition of the first color coating.

12. The gutter cover of claim 1, wherein the rearward facing surfaces of the front and rear strands have a second coating thereon that has a structural composition that is different than a structural composition of the first color coating.

13. A method of making expanded metal gutter covers, the method comprising
providing an elongate strip of solid sheet metal having a top face, a bottom face, and opposite side edges along the strip, at least the top face of the strip having a top color coating thereon comprising a first color,
expanding the coated strip to form metal strands defining a plurality of expanded openings,
forming the expanded coated strip to have a gutter cover configuration, and
cutting the expanded and formed coated strip to make individual gutter covers;
wherein at least one of the individual gutter covers comprises:
a length, a width, a front side, a rear side, and opposite ends, the gutter cover comprising an installed orientation in which the rear side is adjacent a roof and the front side is adjacent a front of the gutter away from the roof, the gutter cover further comprising
a front section extending lengthwise of the gutter cover,
a rear section extending lengthwise of the gutter cover,
a center section extending lengthwise of the gutter cover between the front section and the rear section, the center section having top and bottom surfaces and comprising the plurality of expanded openings defined by metal strands connected by bonds, each opening having a front edge defined by a front strand toward the front side of the gutter cover and a rear edge defined by an opposing rear strand spaced rearward from the front strand toward the rear side of the gutter cover,
the front strands of the openings comprising generally forward facing surfaces and generally rearward facing surfaces when the gutter cover is in the installed orientation,
the rear strands of the openings comprising generally forward facing surfaces and generally rearward facing surfaces when the gutter cover is in the installed orientation, and
wherein the forward facing surfaces of the front and rear strands have a first color coating thereon and the rearward facing surfaces of the front and rear strands are free of the first color coating;
wherein the generally forward facing surfaces of the front strands and the generally rearward facing surfaces of the rear strands are arranged to be inclined relative to the top and bottom surfaces of the center section of the gutter cover when the gutter cover is in the installed orientation;
wherein the rearward facing surface of the front strand of each opening is arranged to face generally across the respective opening toward the rear strand of the respective opening and toward the roof when the gutter cover is in the installed orientation; and the forward facing surface of the rear strand of each opening is arranged to face generally across the respective opening toward the front strand of the respective opening and away from the roof when the gutter cover is in the installed orientation; and
wherein at least the front section and the center section are integrally formed from a single piece of metal and the front section defines a recess extending lengthwise of the gutter cover and configured to receive a front flange of the gutter therein to secure the gutter cover to the gutter in the installed orientation in which the top surface faces generally upward away from the gutter and the bottom surface faces generally downward and toward the gutter, the recess being offset vertically from the top surface of the center section in the installed orientation.

14. The method of claim 13, wherein the first color is a color other than black.

15. The method of claim 14, further comprising selecting the first color to substantially match a color of one or more gutters on which the individual gutter covers are to be installed.

16. The method of claim 13, wherein the bottom face of the strip is coated with a bottom coating.

17. The method of claim 13, wherein the top and bottom coatings are different in color and/or composition.

18. The method of claim 13, wherein said expanding comprises expanding the strip widthwise of the strip, and wherein said openings are elongate openings each having a long axis dimension extending lengthwise of the strip and a short axis dimension extending widthwise of the strip.

19. The method of claim 18, wherein the sheet metal comprises aluminum.

20. The method of claim 18, wherein the sheet metal comprises galvanized steel.

21. A method of making expanded metal gutter covers having different colors for installation on gutters having corresponding different colors, the method comprising
providing an elongate first strip of solid sheet metal, the first strip having a length, a width, opposite top and bottom faces, and opposite side edges along the first strip, at least the top face of the first strip having a top coating comprising a first color,
expanding the first strip to form metal strands defining a first plurality of expanded openings,
forming the expanded first strip to have a first gutter cover configuration,
cutting the expanded and formed first strip to make individual first gutter covers,
providing an elongate second strip of solid sheet metal, the second strip having a length, a width, opposite top and bottom faces, and opposite side edges along the second strip, at least the top face of the second strip having a top coating comprising a second color different from said first color,
expanding the second strip to form metal strands having a second plurality of expanded openings therein,
forming the expanded second strip to have a second gutter cover configuration the same as or different from the first gutter cover configuration, and cutting the expanded and formed second strip to make individual second gutter covers, the first gutter covers being adapted to be installed on one or more gutters having a first matching color substantially matching said first color, and the second gutter covers being adapted to be installed on one or more gutters having a second matching color substantially matching said second color;

wherein at least one of the first and second individual gutter covers comprises:

a length, a width, a front side, a rear side, and opposite ends, the gutter cover comprising an installed orientation in which the rear side is adjacent a roof and the front side is adjacent a front of the gutter away from the roof, the gutter cover further comprising a front section extending lengthwise of the gutter cover, rear section extending lengthwise of the gutter cover, a center section extending lengthwise of the gutter cover between the front section and the rear section, the center section having top and bottom surfaces and comprising at least one of the first and second plurality of expanded openings defined by metal strands connected by bonds, each opening having a front edge defined by a front strand toward the front side of the gutter cover and a rear edge defined by an opposing rear strand spaced rearward from the front strand toward the rear side of the gutter cover, the front strands of the openings comprising generally forward facing surfaces and generally rearward facing surfaces when the gutter cover is in the installed orientation, the rear strands of the openings comprising generally forward facing surfaces and generally rearward facing surfaces when the gutter cover is in the installed orientation, and wherein the forward facing surfaces of the front and rear strands have a first color coating thereon and the rearward facing surfaces of the front and rear strands are free of the first color coating;

wherein the generally forward facing surfaces of the front strands and the generally rearward facing surfaces of the rear strands are arranged to be inclined relative to the top and bottom surfaces of the center section of the gutter cover when the gutter cover is in the installed orientation;

wherein the rearward facing surface of the front strand of each opening is arranged to face generally across the respective opening toward the rear strand of the respective opening and toward the roof when the gutter cover is in the installed orientation, and the forward facing surface of the rear strand of each opening is arranged to face generally across the respective opening toward the front strand of the respective opening and away from the roof when the gutter cover is in the installed orientation; and wherein at least the front section and the center section are integrally formed from a single piece of metal and the front section defines a recess extending lengthwise of the gutter cover and configured to receive a front flange of the gutter therein to secure the gutter cover to the gutter in the installed orientation in which the top surface faces generally upward away from the gutter and the bottom surface faces generally downward and toward the gutter, the recess being offset vertically from the top surface of the center section in the installed orientation.

22. The method of claim 21, wherein said expanding comprises expanding the first and second strips widthwise of the strips, and wherein said first and second openings are elongate openings each having a long axis dimension extending lengthwise of a respective strip and a short axis dimension extending widthwise of a respective strip.

23. The method of claim 22, wherein the sheet metal of the first and second strips comprises aluminum.

24. The method of claim 22, wherein the sheet metal of the first and second strips comprises galvanized steel.

25. The gutter cover of claim 1, wherein said first color coating comprises a color other than black.

* * * * *